(12) United States Patent
Okochi et al.

(10) Patent No.: US 12,237,724 B2
(45) Date of Patent: Feb. 25, 2025

(54) ROTOR FOR ROTATING ELECTRIC MACHINE

(71) Applicant: TOYOTA JIDOSHA KABUSHIKI KAISHA, Toyota (JP)

(72) Inventors: Toshinori Okochi, Toyota (JP); Keiji Kondo, Nagoya (JP); Yoshizumi Kitahara, Nishio (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 402 days.

(21) Appl. No.: 17/666,668

(22) Filed: Feb. 8, 2022

(65) Prior Publication Data

US 2022/0255377 A1 Aug. 11, 2022

(51) Int. Cl.
*H02K 1/276* (2022.01)

(52) U.S. Cl.
CPC .................. *H02K 1/2766* (2013.01)

(58) Field of Classification Search
CPC .. H02K 1/2766; H02K 2201/09; H02K 1/274; H02K 2213/03
See application file for complete search history.

(56) References Cited

U.S. PATENT DOCUMENTS

| 7,560,842 | B2 | 7/2009 | Hattori |
| 10,686,341 | B2 | 6/2020 | Sano et al. |
| 2007/0063607 | A1 | 3/2007 | Hattori |
| 2015/0295462 | A1 | 10/2015 | Takahashi |
| 2017/0085142 | A1 | 3/2017 | Murota et al. |
| 2019/0089216 | A1* | 3/2019 | Sano ............... H02K 1/165 |
| 2020/0186015 | A1* | 6/2020 | Maki ............... B21D 28/22 |

FOREIGN PATENT DOCUMENTS

| JP | 2003-264947 A | 9/2003 |
| JP | 2007-089291 A | 4/2007 |
| JP | 2016-077032 A | 5/2016 |
| JP | 6172381 B2 | 8/2017 |
| JP | 2019-054659 A | 4/2019 |

\* cited by examiner

*Primary Examiner* — Terrance L Kenerly
*Assistant Examiner* — Riley Owen Stout
(74) *Attorney, Agent, or Firm* — Oliff PLC (57) ABSTRACT

A rotor for a rotating electric machine includes a rotor core provided with a pair of first magnets and a pair of second magnets that are located closer than the first magnets to an outer peripheral side of the rotor core. The rotor core includes a caulking portion disposed in a region between first and second imaginary lines in a radial direction of the rotor core. The first imaginary line is an arc passing through outer-peripheral-side end portions of respective long sides of rectangular-shaped cross sections of the first magnets. The second imaginary line is an arc passing through inner-peripheral-side end portions of respective long sides of rectangular-shaped cross sections of the second magnets. The arc of each of the first and second imaginary lines has a center of curvature that lies at an intersection of extensions of the long sides of the rectangular-shaped cross sections of the second magnets.

5 Claims, 4 Drawing Sheets

ROTOR FOR ROTATING ELECTRIC MACHINE

This application claims priority from Japanese Patent Application No. 2021-019339 filed on Feb. 9, 2021, the disclosure of which is hereby incorporated by reference in its entirety.

FIELD OF THE INVENTION

The present invention relates to a rotor that is to be provided in a rotating electric machine, and particularly relates to techniques for appropriately determining a position of a caulking portion.

BACKGROUND OF THE INVENTION

There is known a rotor which is to be provided in a rotating electric machine, and which includes a cylindrical-shaped rotor core constituted by a multiplicity of laminated steel plates, wherein the rotor core is provided with magnets that are disposed on opposite sides, in a circumferential direction of the rotor core, of a q-axis extending in a radial direction of the rotor core, and wherein the rotor core is further provided with a caulking portion that is disposed on the q-axis to position the laminated steel plates relative to each other (see FIG. 8 of JP2007-89291A).

JP2019-54659A discloses a rotor which is to be provided in a rotating electric machine, and which includes a rotor core provided with a plurality of pairs of magnets, such that each of the pairs of magnets are disposed symmetrically with each other with respect to a d-axis passing through an axis (about which the rotor is to be rotated) and are arranged to have a V shape or U shape that opens toward an outer peripheral side of the rotor core, and such that the pairs are spaced apart from each other in a radial direction of the rotor core, wherein the rotor core is provided with a plurality of magnetic poles that are arranged at a constant angular interval around the axis, such that each of the magnetic poles is constituted by the plurality of pairs of magnets. In this arrangement, the above-described q-axis corresponds to an intermediate line between each adjacent two of the plurality of magnetic poles, which are adjacent to each other in a circumferential direction of the rotor core, and each of a plurality of pairs of magnets are disposed symmetrically with each other with respect to the q-axis such that the pairs are spaced apart from each other in the radial direction of the rotor core and such that each of the pairs cooperate with each other to define a magnetic flux passage therebetween.

SUMMARY OF THE INVENTION

By the way, the caulking portion is provided by, for example, providing each of the laminated steel plates with a bent portion, a recessed portion by bulging or drawing, or a burring hole, so that the caulking portion could provide a large magnetic resistance impeding passage of a magnet magnetic flux. Therefore, there is a risk that a motor torque could be reduced due to reduction of amount of the magnet magnetic flux, or a motor efficiency could be reduced due to increase of core ross resulting from eddy current that is caused by magnetic flux fluctuation around the caulking portion. That is, where a pair of magnets are provided on opposite sides of the q-axis and the magnetic flux passage is defined between the pair of magnets, it is desirable that the caulking portion is provided in a position away from the magnetic flux passage so as not to impede or obstruct the passage of the magnet magnetic flux. In the arrangement disclosed in JP2019-54659A in which the plurality of pairs of magnets are provided on the opposite sides of the q-axis and the pairs are spaced apart from each other in the radial direction of the roto core, there is an issue that is where to provide the caulking portion. It might be possible to provide the caulking portion in an outer or inner peripheral end portion of the rotor core that is distant from the magnets, so as to reduce possibility that the passage of the magnet magnetic flux is impeded or obstructed. However, there is a need to dispose the caulking portion in a radially intermediate portion of the rotor core, for example, where a high performance for positioning the laminated steel plates is required.

The present invention was made in view of the background art described above. It is therefore an object of the present invention to make it possible to dispose a caulking portion in a radially intermediate portion of a rotor core while suppressing obstruction to passage of the magnet magnetic flux.

The object indicated above is achieved according to the following aspects of the present invention.

According to a first aspect of the invention, there is provided a rotor that is to be provided in a rotating electric machine, the rotor comprising: a cylindrical-shaped rotor core constituted by a multiplicity of laminated steel plates and provided with magnets that are disposed on opposite sides, in a circumferential direction of the rotor core, of a q-axis extending in a radial direction of the rotor core, wherein the rotor core includes a caulking portion that is provided on the q-axis, such that the laminated steel plates are positioned relative to each other by the caulking portion, wherein the magnets include a pair of first magnets disposed symmetrically with each other with respect to the q-axis and a pair of second magnets disposed symmetrically with each other with respect to the q-axis, such that the second magnets are located closer than the first magnets to an outer peripheral side of the rotor core, wherein each of the first and second magnets has a rectangular shape in a cross section thereof perpendicular to an axis about which the rotor is to be rotated, and a distance between the pair of first magnets and a distance between the pair of second magnets on a perpendicular plane perpendicular to the axis are increased in a direction away from the outer peripheral side toward an inner peripheral side of the rotor core, wherein an angle at a first vertex as an intersection of extensions of long sides of rectangular-shaped cross sections of the pair of first magnets which are opposed to each other with the q-axis being located therebetween, is larger than an angle at a second vertex as an intersection of extensions of long sides of rectangular-shaped cross sections of the pair of second magnets which are opposed to each other with the q-axis being located therebetween, wherein the pair of first magnets cooperate with each other to define a first magnetic-flux passage therebetween, and the pair of second magnets cooperate with each other to define a second magnetic-flux passage therebetween, and wherein the caulking portion is disposed in a position which lies on the q-axis and which is located in a region between first and second imaginary lines in the radial direction of the rotor core, such that the first imaginary line is an arc having a center of curvature that lies at the second vertex and passing through outer-peripheral-side boundary points of the first magnetic-flux passage that are outer-peripheral-side end portions of the respective long sides of the rectangular-shaped cross sections of the pair of first magnets, and such that the second imaginary line is an arc having a center of curvature that lies at the second vertex and passing through inner-peripheral-side boundary points of the second magnetic-flux passage that are inner-peripheral-side end portions of the respective long sides of the rectangular-shaped cross sections of the pair of second magnets.

For example, each of the first and second magnets is received in a magnet receiving hole, such that each of the first magnets is received in the magnet receiving hole with a first gap defined between the magnet receiving hole and a corresponding one of the outer-peripheral-side end portions of respective first long sides that are the respective long sides of the rectangular-shaped cross sections of the first magnets, and such that each of the second magnets is received in the magnet receiving hole with a second gap defined between the magnet receiving hole and a corresponding one of the inner-peripheral-side end portions of respective second long sides that are the respective long sides of the rectangular-shaped cross sections of the second magnets, wherein the outer-peripheral-side boundary points of the first magnetic-flux passage, through which the first imaginary line passes, are first offset points each of which lies on a corresponding one of the first long sides and each of which is offset from an outer-peripheral side end of the corresponding one of the first long sides, by a distance corresponding to the first gap, toward an inner-peripheral side end of the corresponding one of the first long sides, and wherein the inner-peripheral-side boundary points of the second magnetic-flux passage, through which the second imaginary line passes, are second offset points each of which lies on a corresponding one of the second long sides and each of which is offset from an inner-peripheral side end of the corresponding one of the second long sides, by a distance corresponding to the second gap, toward an outer-peripheral side end of the corresponding one of the second long sides.

According to a second aspect of the invention, in the rotor according to the first aspect of the invention, the magnets include a plurality of pairs of magnets, such that each of the pairs of magnets are disposed symmetrically with each other with respect to a d-axis passing through the axis and are arranged to have a V shape or U shape that opens toward the outer peripheral side of the rotor core, and such that the pairs are spaced apart from each other in the radial direction of the rotor core, wherein the rotor core is provided with a plurality of magnetic poles that are arranged at a constant angular interval around the axis, such that each of the magnetic poles is constituted by the plurality of pairs of magnets, wherein the q-axis corresponds to an intermediate line between each adjacent two of the plurality of magnetic poles, which are adjacent to each other in the circumferential direction of the rotor core, and wherein the plurality of pairs of magnets include two pairs of magnets, such that one of the two pairs is closer than the other of the two pairs to the inner peripheral side of the rotor core, and such that each of two magnets of the one of the two pairs corresponds to one of the first magnets while each of two magnets of the other of the two pairs corresponds to one of the second magnets.

According to a third aspect of the invention, in the rotor according to the first or second aspect of the invention, wherein the rotor core is provided with a plurality of magnetic poles that are arranged at a constant angular interval around the axis, wherein each of the magnetic poles has a multi-layer structure including a first layer and a second layer that is closer than the first layer to the outer peripheral side of the rotor core, wherein the first layer is constituted by at least four of the magnets which include the pair of first magnets and the pair of second magnets and which are arranged to have a V shape or U shape that opens toward the outer peripheral side of the rotor core, and wherein the second layer is constituted by at least two of the magnets which are other than the pair of first magnets and the pair of second magnets and which are arranged to have a V shape or U shape that opens toward the outer peripheral side of the rotor core.

According to a fourth aspect of the invention, in the rotor according to any one of the first through third aspects of the invention, the angle at the first vertex is at least three times as large as the angle at the second vertex.

In the above-described rotor that is to be provided in the rotating electric machine, the first imaginary line is the arc having the center of curvature that lies at the second vertex and passing through the outer-peripheral-side boundary points of the first magnetic-flux passage that are the outer-peripheral-side end portions of the respective long sides of the rectangular-shaped cross sections of the pair of first magnets, wherein each of the outer-peripheral-side end portions may be the outer-peripheral side end of a corresponding one of the first long sides, or the first offset point which lies on the corresponding one of the first long sides and which is offset from the outer-peripheral side end of the corresponding one of the first long sides, by the distance corresponding to the first gap, toward the inner-peripheral side end of the corresponding one of the first long sides. The second imaginary line is the arc having the center of curvature that lies at the second vertex and passing through the inner-peripheral-side boundary points of the second magnetic-flux passage that are inner-peripheral-side end portions of the respective long sides of the rectangular-shaped cross sections of the pair of second magnets, wherein each of the inner-peripheral-side end portions may be the inner-peripheral side end of a corresponding one of the first long sides, or the second offset point which lies on the corresponding one of the second long sides and which is offset from the inner-peripheral side end of the corresponding one of the second long sides, by the distance corresponding to the second gap, toward the outer-peripheral side end of the corresponding one of the second long sides. The caulking portion is disposed in the position which lies on the q-axis and which is located in the region between the first and second imaginary lines, namely, in an intermediate portion of the rotor core in the radial direction of the rotor core.

The first and second magnets are located symmetrically on the opposite sides of the q-axis in the circumferential direction, and have the respective long sides in the rectangular-shaped cross sections, wherein the long sides cooperate to form an inverted V shape that opens toward the inner peripheral side of the rotor core. The second magnets are located closer than the first magnets to the outer peripheral side of the rotor core, and the angle at the second vertex as the intersection of the extensions of the long sides of the rectangular-shaped cross sections of the second magnets is smaller than the angle at the first vertex as the intersection of the extensions of the long sides of the rectangular-shaped cross sections of the first magnets. The first imaginary line is the arc having the center of curvature that lies at the second vertex and passing through the outer-peripheral-side boundary points of the first magnetic-flux passage, and is approximated with an outer-peripheral-side boundary of the first magnetic flux passage. The second imaginary line is the arc having the center of curvature that lies at the second vertex and passing through the inner-peripheral-side boundary points of the second magnetic-flux passage, and is approximated with an inner-peripheral-side boundary of the second magnetic flux passage. Thus, with the caulking portion being disposed in the region between the first and second imaginary lines, it is possible to appropriately suppress the caulking portion from obstructing the first and second magnetic flux passages and accordingly to suppress reductions of the motor torque and the motor efficiency that could be caused by the caulking portion.

In the rotor according to the second aspect of the invention, the rotor core is provided with the plurality of magnetic poles that are arranged around the axis, and each of the magnetic poles is constituted by the plurality of pairs of magnets, such that each of the pairs of magnets are disposed symmetrically with each other with respect to the d-axis and are arranged to have the V shape or U shape. The above-described q-axis corresponds to the intermediate line between each circumferentially adjacent two of the plurality of magnetic poles. The plurality of pairs of magnets include the two pairs of magnets, such that one of the two pairs is closer than the other of the two pairs to the inner peripheral side of the rotor core, and such that each of the two magnets of the one of the two pairs corresponds to one of the first magnets while each of the two magnets of the other of the two pairs corresponds to one of the second magnets. It is possible to advantageously apply the present invention that makes it possible to dispose the caulking portion in the radially intermediate portion of the rotor core while suppressing the obstruction to the first and second magnetic-flux passages.

In the rotor according to the third aspect of the invention, each of the magnetic poles has the multi-layer structure including the first layer and the second layer that is closer than the first layer to the outer peripheral side of the rotor core, wherein the first layer is constituted by at least four of the magnets which include the pair of first magnets and the pair of second magnets and which are arranged to have the V shape or U shape that opens toward the outer peripheral side of the rotor core, and wherein the second layer is constituted by at least two of the magnets which are other than the pair of first magnets and the pair of second magnets and which are arranged to have the V shape or U shape that opens toward the outer peripheral side of the rotor core. In this case, too, with the first and second imaginary lines being defined based on the second vertex, and with the caulking portion being disposed in the region between the first and second imaginary lines, it is possible to advantageously obtain effects of the present invention, which are to make it possible to dispose the caulking portion in the radially intermediate portion of the rotor core while suppressing the obstruction to the first and second magnetic-flux passages.

In the rotor according to the fourth aspect of the invention, the angle at the first vertex is at least three times as large as the angle at the second vertex. There could be an issue that is how to define the first imaginary line related to the first magnets wherein the angle at the first vertex (i.e., angle defined by the extensions of the long sides of the rectangular-shaped cross sections of the first magnets) is relatively large. The first imaginary line is the arc having the center of curvature that lies at the second vertex and passing through the outer-peripheral-side boundary points of the first magnets, so that the caulking portion can be disposed in the radially intermediate portion of the rotor core with obstruction to the first magnetic-flux passage being suppressed. It might be possible to set the first imaginary line to an arc having a center of curvature that lies at the first vertex and passing through the outer-peripheral-side boundary points of the first magnets. However, in this arrangement, since the angle at the first vertex is large, the first imaginary line is largely bulged toward the inner peripheral side of the rotor core, so that the first magnetic-flux passage could be formed also in a region on the outer peripheral side of the rotor core than the first imaginary line, thereby resulting in a risk that the passage of the magnet magnetic flux could be obstructed by the caulking portion. Further, it might be possible to set the first imaginary line to a straight line passing through the outer-peripheral-side boundary points of the first magnets. However, in this arrangement, the region in which the caulking portion is to be disposed becomes narrow so that the caulking portion could not be appropriately disposed.

DETAILED DESCRIPTION OF PREFERRED EMBODIMENTS

The rotating electric machine is referred also to as a rotating machine, and may be an electric motor, an electric generator, or a motor generator that can be used selectively as the electric motor or the electric generator. The rotating electric machine is, for example, a permanent-magnet synchronous motor. Although being constituted preferably by a rare-earth element magnet, each of the magnets may be constituted by any of other permanent magnets. For example, the rotor core is provided with a plurality of magnetic poles that are arranged at a constant angular interval around the axis, wherein each of the magnetic poles is constituted by a plurality of pairs of magnets, such that each of the pairs of magnets are arranged to have a V shape or U shape that opens toward an outer peripheral side of the rotor core. In this arrangement, a q-axis corresponds to an intermediate line between each adjacent two of the plurality of magnetic poles, which are adjacent to each other in the circumferential direction of the rotor core, and two pairs of magnets in the form of a pair of first magnets and a pair of second magnets are disposed on opposite sides of the q-axis. An arrangement pattern of the two pairs of magnets is appropriately determined at least such that the two pairs are disposed symmetrically with respect to the q-axis, and spaced apart from each other in a radial direction of the rotor core. It is preferable that each of the magnetic poles has a multi-layer structure including a first layer and a second layer that is closer than the first layer to the outer peripheral side of the rotor core, wherein the first layer is constituted by at least four of the magnets which include the pair of first magnets and the pair of second magnets and which are arranged to have a V shape or U shape, and the second layer is constituted by at least two of the magnets which are other than the pair of first magnets and the pair of second magnets and which are arranged to have a V shape or U shape.

However, each of the magnetic poles may be a single-layer structure consisting of only the first layer.

For example, each of the magnets is fixedly received in a magnet receiving hole such as a flux barrier, with a gap (corner gap) defined between the magnet receiving hole and each corner portion of the each of the magnets. However, each magnet can be fixedly received in the magnet receiving hole without such a gap. In a case without the above-described gap, a first imaginary line may be an arc passing through outer-peripheral-side ends of respective long side ends of rectangular-shaped cross sections of the first magnets wherein the long sides are opposed to each other with the q-axis being located therebetween, and a second imaginary line may be an arc passing through inner-peripheral-side ends of respective long sides of rectangular-shaped cross sections of the second magnets wherein the long sides are opposed to each other with the q-axis being located therebetween. In a case with the above-described gap in which each of the first magnets is received in the magnet receiving hole with a first gap defined between the magnet receiving hole and a corresponding one of outer-peripheral-side end portions of respective first long sides that are the respective long sides of the rectangular-shaped cross sections of the first magnets, and each of the second magnets is received in the magnet receiving hole with a second gap defined between the magnet receiving hole and a corresponding one of inner-peripheral-side end portions of respective second long sides that are the respective long sides of the rectangular-shaped cross sections of the second magnets, the first imaginary line may be an arc passing through positions each of which lies on a corresponding one of the first long sides and each of which is offset from the outer-peripheral side end of the corresponding one of the first long sides, by a distance corresponding to the first gap, toward the inner-peripheral side end of the corresponding one of the first long sides, and the second imaginary line may be an arc passing through positions each of which lies on a corresponding one of the second long sides and each of which is offset from the inner-peripheral side end of the corresponding one of the second long sides, by a distance corresponding to the second gap, toward the outer-peripheral side end of the corresponding one of the second long sides. It is noted that the first magnets are the second magnets are positioned such that the above-described inner-peripheral-side ends of the respective long sides of the rectangular-shaped cross sections of the second magnets are located closer to the outer peripheral side of the rotor core, than the above-described outer-peripheral-side ends of the respective long side ends of the rectangular-shaped cross sections of the first magnets.

The caulking portion may be provided, for example, by providing each of laminated steel plates (that cooperate to constitute the rotor core) with a recess by bulging or drawing, by bending a part with slits on its both sides into a V shape, or by forming a burring hole. The caulking portion is provided to have, for example, an elongated shape such as a rectangular or oval shape elongated along the q-axis so as not to obstacle a stator magnetic flux passing along the q-axis. However, the caulking portion may be provided to have, for example, a circular or square shape or a rectangular or oval shape elongated in a direction perpendicular to the q-axis.

An angle at a first vertex as an intersection of extensions of the long sides of the rectangular-shaped cross sections of the pair first magnets is preferably at least three times as large as an angle at a second vertex as an intersection of extensions of the long sides of the rectangular-shaped cross sections of the pair of second magnets. However, the angle at the first vertex may be four times or more as large as the angle at the second vertex. Moreover, the angle at the first vertex does not necessarily have to be at least three times as large as the angle at the second vertex, as long as the angle at the first vertex is larger than the angle at the second vertex.

EMBODIMENTS

Hereinafter, preferred embodiments of the invention will be described in detail with reference to the accompanying drawings. The figures of the drawings are simplified or deformed as needed, and each portion is not necessarily precisely depicted in terms of dimension ratio, shape, etc.

Figure 1:
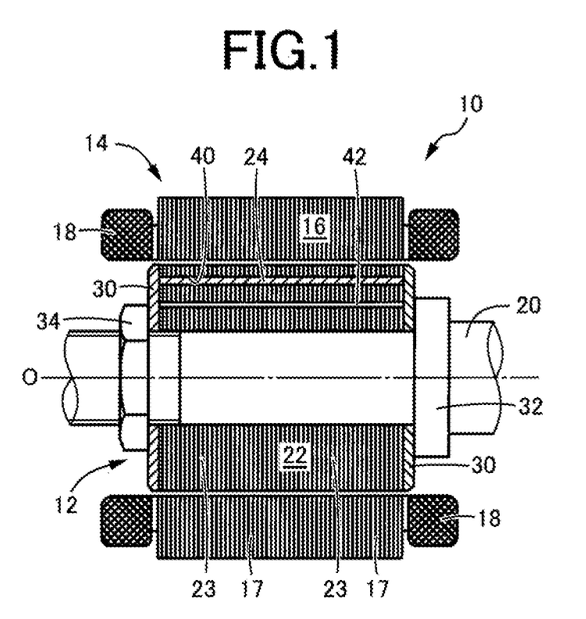
FIG. 1 is a schematic cross-sectional view for explaining a rotating electric machine including a rotor that is constructed according to an embodiment of the present invention.
Figure 2:
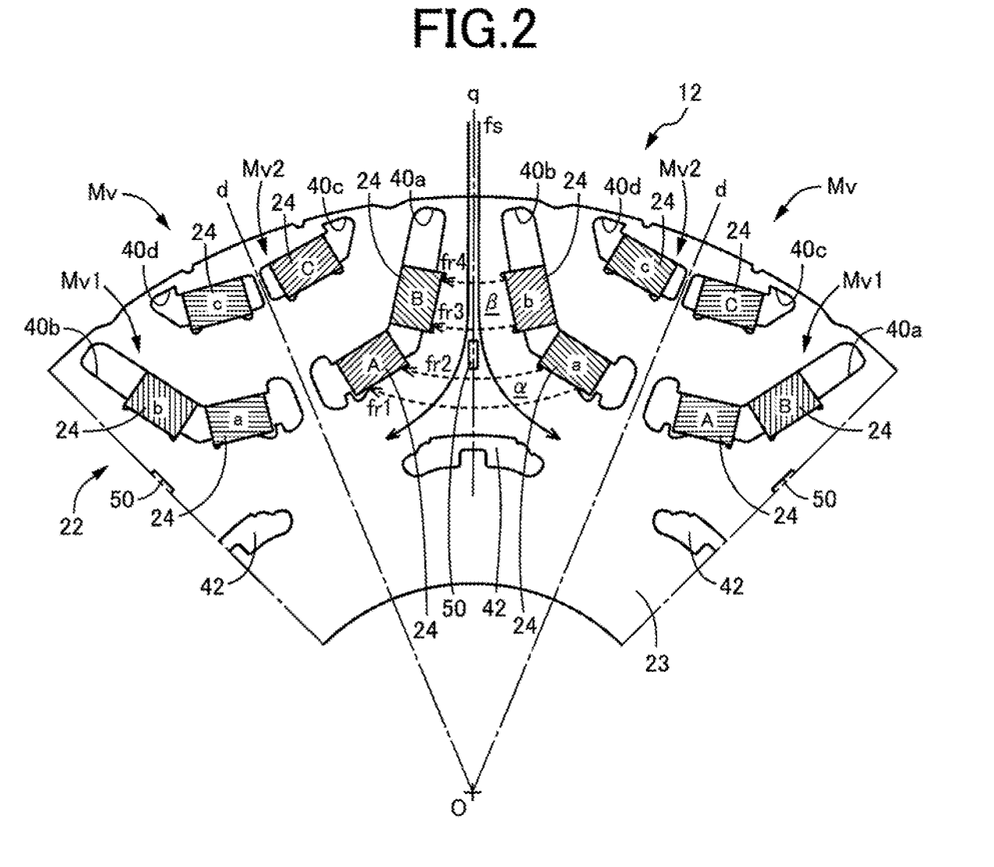
FIG. 2 is a view showing in enlargement a part of a cross section of the rotor taken in a plane perpendicular to an axis O of the rotor shown in FIG. 1, wherein the part corresponds to a quarter circle about the axis O.

FIG. 1 is a schematic cross-sectional view for explaining a rotating electric machine 10 including a rotor 12 according to an embodiment of the present invention, taken in a plane containing a rotation axis O of the rotating electric machine 10. The rotor 12 is to be rotated about the rotation axis O. FIG. 2 is a view showing in enlargement a part of a cross section of the rotor 12 taken in a plane perpendicular to the axis O, wherein the part corresponds to a quarter circle about the axis O (in an angular range of 90°). The rotating electric machine 10 is a permanent-magnet embedded type synchronous motor serving as a motor generator that can be used selectively as an electric motor or a generator. The rotating electric machine 10 is advantageously used as a drive power source of a battery electric vehicle such as a hybrid electric vehicle, for example. The rotating electric machine 10 includes the above-described rotor 12 and a stator 14 that are coaxial with the axis O. In the following description of the present embodiment, the axis O of the rotating electric machine 10 is also used to refer to an axis of the rotor 12, an axis of the stator 14 and an axis of a rotor shaft 20. The stator 14 includes a cylindrical tubular-shaped stator core 16 disposed on an outer peripheral side of the rotor 12, and a plurality of stator coils 18 wound on the stator core 16. The stator core 16 is constituted by a multiplicity of annular-shaped steel plates that are laminated in an axial direction, i.e., a direction parallel to the axis O, with each of the steel plates being in an attitude perpendicular to the axis O, and is fixed in a casing (not shown) through fixing means such as press-fitting and screw bolts.

The rotor 12 includes the above-described rotor shaft 20, a cylindrical tubular-shaped rotor core 22 attached onto an outer circumferential surface of the rotor shaft 20, and a multiplicity of magnets 24 embedded in the rotor core 22. The rotor core 22 is constituted by a multiplicity of annular-shaped steel plates 23 that are laminated in the axial direction, i.e., the direction parallel to the axis O, with each of the steel plates being in an attitude perpendicular to the axis O. A pair of end plates 30, 30 are provided on axially opposite sides of the rotor core 22, and are fixed to the rotor shaft 22. The annular-shaped steel plates 23 correspond to "laminated steel plates" recited in the appended claims, and will be referred to also as "laminated steel plates 23" where appropriate in the following description. The rotor shaft 20 is provided with a flange portion 32, so that the rotor core 22 is sandwiched or clamped between the flange portion 32 and a nut 34 that is in thread engagement with the rotor shaft 20, whereby the rotor core 22 constituted by the multiplicity of laminated steel plates 23 is fixed onto the rotor shaft 20. Each of the magnets 24 is constituted by a rare-earth element magnet, and is covered with an insulation film, as needed.

As shown in FIG. 2, the rotor core 22 is provided with four kinds of magnet receiving holes in the form of flux barriers 40a, 40b, 40c, 40d (hereinafter referred simply to as flux barriers 40 unless they are to be distinguished from one another). Each of the flux barriers 40 is formed through the rotor core 22 in the axial direction, and includes a magnet receiving portion or portions in which the magnet or magnets 24 are received. The magnet or magnets 24 received in the magnet receiving portion or portions of each of the flux barriers 40 are fixed by adhesive or the like so as to have a certain attitude. As shown in FIG. 2, the magnets 24 are categorized into six kinds of magnets A, a, B, b, C, c. In the following description, each of the magnets 24 will be referred to as "magnet A, a, B, b, C or c" as needed. Each of the magnets A, a, B, b, C, c has a rectangular shape in its cross section parallel to a perpendicular plane that is perpendicular to the axis O, as shown in FIG. 2, and has a rectangular prism shape whose length is substantially equal to an axial length of the rotor core 22. Each of the magnets A and each of the magnets B are fixed in a corresponding one of the flux barriers 40a. Each of the magnets a and each of the magnets b are fixed in a corresponding one of the flux barriers 40b. Each of the magnets C is fixed in a corresponding one of the flux barriers 40c. Each of the magnets c is fixed in a corresponding one of the flux barriers 40d. Each flux barrier 40a has a bent portion in a lengthwise intermediate portion in it cross section, and the corresponding magnet A and the corresponding magnet B are fixed on respective opposite sides of the bent portion. Similarly, each flux barrier 40b has a bent portion in a lengthwise intermediate portion in it cross section, and the corresponding magnet a and the corresponding magnet b are fixed on respective opposite sides of the bent portion. Further, each flux barrier 40 has voids or free spaces left on respective opposite sides of the corresponding magnet 24 (that is fixedly received in the each flux barrier 40), and the voids or free spaces can serve as passages through which a cooling fluid is to pass to cool the corresponding magnet 24. Each of the flux barriers 40 corresponds to "magnet receiving hole" recited in the appended claims.

The four kinds of flux barriers 40a, 40b, 40c, 40d form a plurality of V-shaped arrangement patterns (eight V-shaped arrangement patterns Pv in the present embodiment) in each of which the flux barriers 40a, 40b, 40c, 40d are arranged to have a V shape or U shape that opens toward an outer peripheral side of the rotor core 22, such that the plurality of V-shaped arrangement patterns Pv are arranged at a constant angular interval around the axis O of the rotor core 22. The rotor core 22 is provided with a plurality of magnetic poles Mv (eight magnetic poles Mv in the present embodiment) that are arranged at a constant angular interval around the axis O, such that each of the magnetic poles Mv is constituted by corresponding six of the magnets 24 which form a corresponding one of the V-shaped arrangement patterns. Each of the V-shaped arrangement patterns Pv of a corresponding one of the magnetic poles Mv has a shape symmetrical with respect to a d-axis that passes through the axis O. That is, the pair of flux barriers 40a, 40b are symmetrical with each other with respect to the d-axis that is located therebetween, and the magnets A, B fixedly received in the flux barrier 40a and the magnets a, b fixedly received in the flux barrier 40b are arranged symmetrically with respect to the d-axis that is located therebetween so as to have a V shape or U shape as a whole. Further, the flux barriers 40c, 40d are symmetrical with each other with respect to the d-axis that is located therebetween, and the magnet C fixedly received in the flux barrier 40c and the magnet c fixedly received in the flux barrier 40d are arranged symmetrically with respect to the d-axis that is located therebetween so as to have a V shape or U shape as a whole. In the present embodiment, each of the magnetic poles Mv has a two-layer structure including a first layer Mv1 and a second layer Mv2 that is closer than the first layer Mv1 to the outer peripheral side of the rotor core 22, wherein the first layer Mv1 is constituted by the four magnets A, a, B, b that are arranged to have the V shape or U shape while the second layer Mv2 is constituted by the pair of magnets C, c that are arranged to have the V shape or U shape. It is noted that the second layer Mv2 may be omitted.

Figure 4:
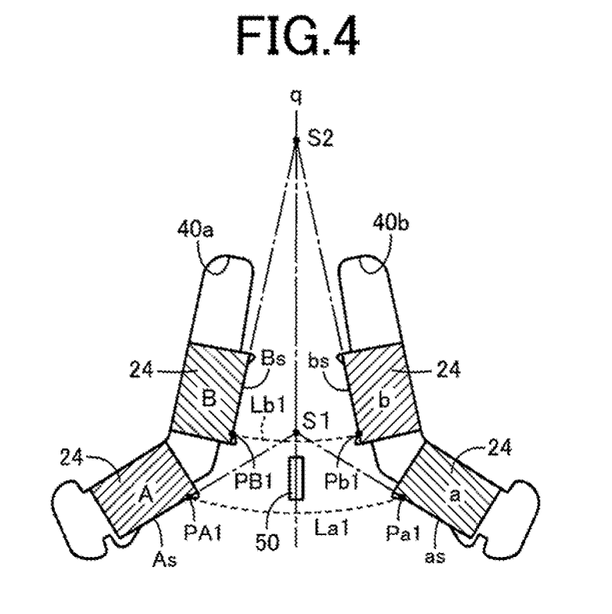
FIG. 4 is view showing a part of FIG. 2 in further enlargement, wherein the part is in the vicinity of the q-axis.
Figure 5:
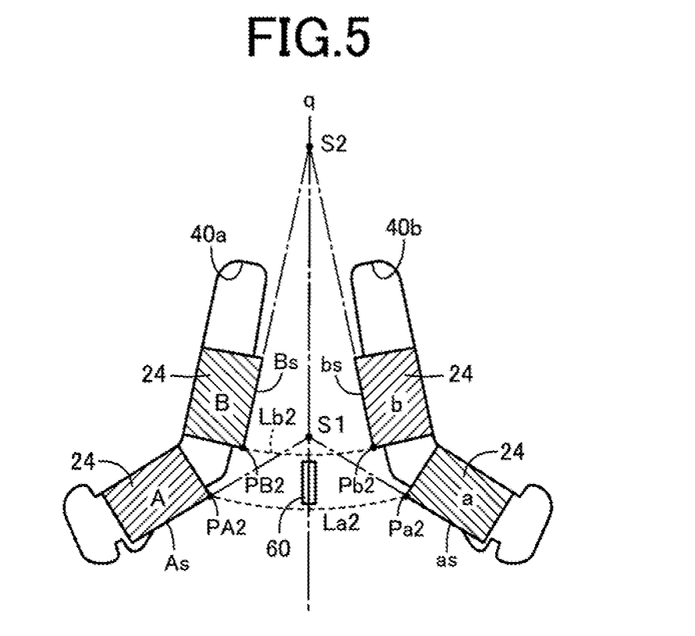
FIG. 5 is a view corresponding to the view of FIG. 4 and showing another embodiment of the present invention.

In the rotor 12 described above, an intermediate line between each adjacent two of the magnetic poles Mv, which are adjacent to each other in a circumferential direction of the rotor core 22, is a q-axis, so that a stator magnetic flux (magnetic flux of rotating magnetic field produced by the stator 14) is caused to pass through the rotor 12 along the q-axis when the rotor 12 is used as a component of the rotating electric machine 10. On respective opposite sides of the q-axis in the circumferential direction, a pair of the flux barriers 40a, 40b are located symmetrically with each other with respect to the q-axis, such that the flux barriers 40a, 40b are closer to the q-axis, than the others flux barriers 40, in the circumferential direction, and such that the pair of the flux barriers 40a, 40b cooperate with each other to form an inverted V shape that opens toward an inner peripheral side of the rotor core 22. Further, the magnets A, a and the magnets B, b, which are fixedly received in the pair of the flux barriers 40a, 40b, are located symmetrically on the opposite sides of the q-axis in the circumferential direction, and have respective long sides in the rectangular-shaped cross sections, wherein the long sides cooperate to form an inverted V shape that opens toward the inner peripheral side of the rotor core 22. The magnets A, a, which are located on the inner peripheral side than the magnets B, b, constitute "pair of first magnets" recited in the appended claims, and will be referred to also as "first magnets A, a" in the following description where appropriate. The magnets B, b, which are located on the outer peripheral side than the magnets A, a, constitute "pair of second magnets" recited in the appended claims, and will be referred to also as "second magnets B, b" in the following description where appropriate. Each of the second magnets B, b is spaced apart from a corresponding one of the first magnets A, a in a radial direction of the rotor core 22, and is closer than the corresponding one of the first magnets A, a to the outer peripheral side of the rotor core 22 in the radial direction. More specifically, the first magnets A, a have, in the rectangular-shaped cross sections, the long sides As, as (hereinafter referred to as "first long sides As, as") (see FIGS. 4 and 5) that are opposed to each other with the q-axis being located therebetween, while the second magnets B, b have, in the rectangular-shaped cross sections, the long sides Bs, bs (hereinafter referred to as "second long sides Bs, bs") (see FIGS. 4 and 5) that are opposed to each other with the q-axis being located therebetween. The first magnet A and the second magnet B, which are fixedly received in the flux barrier 40a, are positioned relative to each other, such that an inner-peripheral-side end, i.e., an inner-peripheral-side corner (corresponding to an inner-peripheral-side boundary point PB2 shown in FIG. 5) of the second long side Bs of the second magnet B is spaced apart from an outer-peripheral-side end, i.e., an outer-peripheral-side corner (corresponding to an outer-peripheral-side boundary point PA2 shown in FIG. 5) of the first long side As of the first magnet A in the radial direction, and such that the inner-peripheral-side end of the second long side Bs of the second magnet B is closer than the outer-peripheral-side end of the first long side As of the first magnet A to the outer peripheral side of the rotor core 22, namely, the inner-peripheral-side end of the second long side Bs is located on an upper side of the outer-peripheral-side end of the first long side As, as seen in FIGS. 4 and 5. Similarly, the first magnet a and the second magnet b, which are fixedly received in the flux barrier 40b, are positioned relative to each other, such that an inner-peripheral-side end, i.e., an inner-peripheral-side corner (corresponding to an inner-peripheral-side boundary point Pb2 shown in FIG. 5) of the second long side bs of the second magnet b is spaced apart from an outer-peripheral-side end, i.e., an outer-peripheral-side corner (corresponding to an outer-peripheral-side boundary point Pa2 shown in FIG. 5) of the first long side as of the first magnet a in the radial direction, and such that the inner-peripheral-side end of the second long side bs of the second magnet b is closer than the outer-peripheral-side end of the first long side as of the first magnet a to the outer peripheral side of the rotor core 22, namely, the inner-peripheral-side end of the second long side bs is located on an upper side of the outer-peripheral-side end of the first long side as, as seen in FIGS. 4 and 5.

In FIG. 2, solid line arrows fs represent examples of magnetic field lines of the stator magnetic flux passing along the q-axis. As shown in FIG. 2, the stator magnetic flux is allowed to pass along the q-axis through a space defined between the flux barriers 40a, 40b that are located on the respective opposite sides of the q-axis. Although a direction of the magnetic field lines fs of the stator magnetic flux is downward in the example shown in FIG. 2, the direction of the magnetic field lines fs may be upward in FIG. 2. The rotor core 22 further has void portions 42 that are formed through the rotor core 22 in the axial direction. Each of the void portions 42 is disposed on the q-axis, and is located on the inner peripheral side than the flux barriers 40c, 40d. Each of the void portions 42 serves as a cooling hole through which the cooling fluid is to pass for cooling the magnets 24, particularly, the pair of first magnets A, a that are located on the inner peripheral side than the other magnets B, b, C, c, or serves as a magnetic-flux detour hole for detouring the magnetic-flux, namely, limiting passage of the magnetic flux. Further, each of the void portions 42 may serve as both of the cooling hole and the magnetic-flux detour hole. Each of the void portions 42 has a shape which is symmetrical with respect to the q-axis in the circumferential direction, and which is curved to be convexed toward the outer peripheral side of the rotor core 22.

The first magnets A, a are opposite to each other in terms of N-S polarity, so that the magnet magnetic flux is produced between mutually opposed surfaces of the respective first magnets A, a. Similarly, the second magnets B, b are opposite to each other in terms of N-S polarity, so that the magnet magnetic flux is produced between mutually opposed surfaces of the respective second magnets B, b. In FIG. 2, broken line arrows fr1-fr4 represent examples of magnetic field lines of the magnet magnetic flux produced between the first magnets A, a and between the second magnets B, b. The magnet magnetic flux passes between the first magnets A, a in a region defined between the magnetic field line fr1 and the magnetic field line fr2, wherein the magnetic field line fr1 connects between inner-peripheral side end portions of the long sides of the respective first magnets A, a that are opposed to each other with the q-axis being located therebetween, and wherein the magnetic field line fr2 connects between outer-peripheral-side end portions of the long sides of the respective first magnets A, a (see FIG. 2). The region in which the magnet magnetic flux passes between the first magnets A, a will be referred to as "first magnetic-flux passage α" in the following description.

Similarly, the magnet magnetic flux passes between the second magnets B, b in a region defined between the magnetic field line fr3 and the magnetic field line fr4, wherein the magnetic field line fr3 connects between inner-peripheral-side end portions of the long sides of the respective second magnets B, b that are opposed to each other with the q-axis being located therebetween, and wherein the magnetic field line fr4 connects between outer-peripheral-side end portions of the long sides of the respective second magnets B, b (see FIG. 2). The region in which the magnet magnetic flux passes between the second magnets B, b will be referred to as "second magnetic-flux passage β" in the following description. Although a direction of the magnetic field lines fr1-fr4 of the magnet magnetic flux is leftward in the example shown in FIG. 2, the direction of the magnetic field lines fr1-fr4 may be rightward in FIG. 2. A path of each of the magnetic field lines fr1-fr4 is likely to vary depending on attitudes and magnetic charges (magnetic moments) of corresponding ones of the magnets A, a, B, b and also a magnetic permeability of the rotor core 22. Further, each of the magnet receiving portions of the flux barrier 40 is provided with recesses such that gaps (corner gaps) are defined between corner portions of a corresponding one of the magnets 24 and the each of the magnet receiving portions. Since each of the corner gaps provides the magnetic resistance, the magnetic field lines fr1-fr4 are defined such that (i) the magnetic field line fr1 connects between a position which lies on the first long side As and which is offset from the inner-peripheral side end of the first long side As by a distance corresponding to the corresponding corner gap and a position which lies on the first long side as and which is offset from the inner-peripheral side end of the first long side as by a distance corresponding to the corresponding corner gap, (ii) the magnetic field line fr2 connects between a position which lies on the first long side As and which is offset from the outer-peripheral side end of the first long side As by a distance corresponding to the corresponding corner gap and a position which lies on the first long side as and which is offset from the outer-peripheral side end of the first long side as by a distance corresponding to the corresponding corner gap, (iii) the magnetic field line fr3 connects between a position which lies on the second long side Bs and which is offset from the inner-peripheral side end of the second long side Bs by a distance corresponding to the corresponding corner gap and a position which lies on the second long side bs and which is offset from the inner-peripheral side end of the second long side bs by a distance corresponding to the corresponding corner gap, and (iv) the magnetic field line fr4 connects between a position which lies on the second long side Bs and which is offset from the outer-peripheral side end of the second long side Bs by a distance corresponding to the corresponding corner gap and a position which lies on the second long side bs and which is offset from the outer-peripheral side end of the second long side bs by a distance corresponding to the corresponding corner gap.

Figure 3:
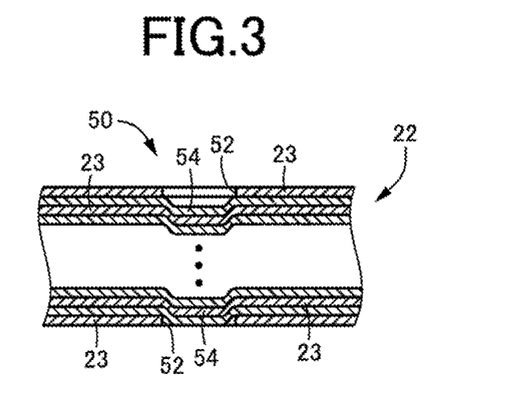
FIG. 3 is a cross sectional view showing in enlargement a caulking portion disposed on a q-axis that is shown in FIG. 2.

The rotor core 22 includes caulking portions 50 each of which is provided on the q-axis such that each of the caulking portions 50 is located in a position distant from a corresponding one of the void portions 42 that is also provided on the same q-axis. The laminated steel plates 23 are fixedly positioned relative to one another by the caulking portions 50. FIG. 3 is a cross sectional view showing in enlargement an example of each caulking portion 50. As shown in FIG. 3, a punch is introduced into one of two through-holes S2, which are formed through respective opposite end ones of the multiplicity of laminated steel plates 23 laminated on one another to constitute the rotor core 22, and is pressed to perform bulging or drawing, so as to form recessed portions 54 (that may be referred to also as "protrusion portions 54"). The formed recessed portions 54 are fitted with one another whereby the multiplicity of laminated steel plates 23 are positioned relative to one another so as to be fixed to one another and undisplaceable relative to one another in a plane perpendicular to the axis O (i.e, plane parallel to drawing sheet of FIG. 2). In the present embodiment, the bulging or drawing is performed once for all of the multiplicity of laminated steel plates 23 constituting the rotor core 22. However, the multiplicity of laminated steel plates 23 may be grouped into a plurality of groups each consisting of a predetermined number of laminated steel plates 23, and the bulging or drawing may be performed for each of the plurality of groups so as to form the recessed portions 54.

Each of the caulking portions 50 could provide a large magnetic resistance impeding passage of the magnet magnetic flux. Therefore, there is a possibility that a motor torque could be reduced due to reduction of amount of the magnet magnetic flux, or a motor efficiency could be reduced due to increase of core ross resulting from eddy current that is caused by magnetic flux fluctuation around the caulking portion 50. In the present embodiment, the caulking portion 50 has a rectangular shape elongated along the q-axis so as not to obstruct the stator magnetic flux that passes along the q-axis as indicated by the solid line arrows fs shown in FIG. 2. The caulking portion 50 is required to be disposed so as not to obstruct the first magnetic-flux passage α that is formed between the first magnets A, a and the second magnetic-flux passage β that is formed between the second magnets B, b. Further, there is a need to dispose the caulking portion 50 in a radially intermediate portion of the rotor core 22, for example, where a high performance for positioning the multiplicity of laminated steel plates 23 is required, so that it is desirable that the caulking portion 50 is disposed in a position which is on the q-axis and which is within a region between the first magnetic-flux passage α and the second magnetic-flux passage β For disposing the caulking portion 50 in such a position, there is an issue that is how to define the first magnetic-flux passage α and the second magnetic-flux passage β, in other words, how to define the region between the first magnetic-flux passage α and the second magnetic-flux passage β The above-described magnetic field lines fr1-fr4 defining the magnetic-flux passages α, β are conceptually shown, by way of examples, in view of factors such as attitudes of the first magnets A, a and the second magnets B, b. For disposing the caulking portion 50 without risk of obstructing the magnetic-flux passages α, β, it is necessary to specifically define boundaries of the magnetic-flux passages α, β.

There will be described a position in which the caulking portion 50 is to be disposed, in detail with reference to FIG. 4. FIG. 4 is view showing a part of FIG. 2 in further enlargement, wherein the part corresponds to the pair of flux barrier 40a, 40b that are disposed on the respective opposite sides of the q-axis. In FIG. 4, a first vertex S1 is a vertex of the inverted V shape of the first magnets A, a having the rectangular-shaped cross sections, and corresponds to an intersection of the extensions of the first long sides As, as of the rectangular-shaped cross sections of the first magnets A, a, wherein the first magnets A, a are closer than the second magnets B, b to the inner peripheral side of the rotor core 22, and wherein the first long sides As, as of the rectangular-shaped cross sections of the first magnets A, a are opposed to each other with the q-axis being located therebetween.

Meanwhile, a second vertex S2 is a vertex of the inverted V shape of the second magnets B, b having the rectangular-shaped cross sections, and corresponds to an intersection of the extensions of the second long sides Bs, bs of the rectangular-shaped cross sections of the second magnets B, b, wherein the second magnets B, b are closer than the first magnets A, a to the outer peripheral side of the rotor core 22, and wherein the second long sides Bs, bs of the rectangular-shaped cross sections of the second magnets B, b are opposed to each other with the q-axis being located therebetween. An interior angle at the first vertex S1 (i.e., angle defined by the extensions of the first long sides As, as) is larger than an interior angle at the second vertex S2 (i.e., angle defined by the extensions of the second long sides Bs, bs), such that the angle at the first vertex S1 is at least three times as large as the angle at the second vertex S2. Specifically, the angle at the first vertex S1 ranges from 100° to 140°, and is about 120° in the present embodiment. The angle at the second vertex S2 ranges from 20° to 40°, and is about 25° in the present embodiment. Thus, the angle at the first vertex S1 is at least four times as large as the angle at the second vertex S2 in the present embodiment.

As shown in FIG. 4, the caulking portion 50 is disposed in a region between a first imaginary line La1 and a second imaginary line La2 in the radial direction of the rotor core 22, wherein the first imaginary line La1 is an imaginary line defining an outer-peripheral-side boundary of the first magnetic-flux passage α, and a second imaginary line La2 is an imaginary line defining an inner-peripheral-side boundary of the second magnetic-flux passage β The first imaginary line La1 is an arc having a center of curvature that lies at the second vertex S2 and passing through outer-peripheral-side boundary points PA1, Pa1 of the first magnetic-flux passage α that are the outer-peripheral-side end portions of the respective first long sides As, as of the rectangular-shaped cross sections of the pair of first magnets A,a. The second imaginary line Lb1 is an arc having a center of curvature that lies at the second vertex S2 and passing through inner-peripheral-side boundary points PB1, Pb1 of the second magnetic-flux passage β that are the inner-peripheral-side end portions of the respective second long sides Bs, bs of the rectangular-shaped cross sections of the pair of second magnets B, b. In the present embodiment, the outer-peripheral-side boundary point PA1 of the first magnetic-flux passage α is set to the position which lies on the first long side As and which is offset from the outer-peripheral side end of the first long side As by the distance corresponding to the corresponding corner gap (first gap) toward the inner-peripheral side end of the first long side As, and the outer-peripheral-side boundary point Pa1 of the first magnetic-flux passage α is set to the position which lies on the first long side as and which is offset from the outer-peripheral side end of the first long side as by the distance corresponding to the corresponding corner gap (first gap) toward the inner-peripheral side end of the first long side as. Similarly, the inner-peripheral-side boundary point PB1 of the second magnetic-flux passage β is set to the position which lies on the second long side Bs and which is offset from the inner-peripheral side end of the second long side Bs by the distance corresponding to the corresponding corner gap (second gap) toward the outer-peripheral side end of the second long side Bs, and the inner-peripheral-side boundary point Pb1 of the second magnetic-flux passage β is set to the position which lies on the second long side bs and which is offset from the inner-peripheral side end of the second long side bs by the distance corresponding to the corresponding corner gap (second gap) toward the outer-peripheral side end of the second long side bs. With the caulking portion 50 being disposed in the region between the first imaginary line La1 and the second imaginary line La2 in the radial direction of the rotor core 22, it is possible to suppress the caulking portion 50 from obstructing the magnetic-flux passages α, and to suppress reductions of the motor torque and the motor efficiency that could be caused by the caulking portion. The first and second imaginary lines La1, Lb1 are approximated with the magnetic field lines fr2, fr3, respectively, which are shown in FIG. 2, so that it is possible to appropriately suppress the caulking portion 50 from obstructing the magnetic-flux passages α,β between the first magnets A, a and between the second magnets B, b, owing to the arrangement in which the caulking portion 50 is disposed in the region between the first and second imaginary lines La1, La2.

Further, there could an issue that is how to define the first imaginary line La1 related to the first magnets A, a, wherein the angle at the first vertex S1 (i.e., angle defined by the extensions of the first long sides As, as) is relatively large and is at least three times as large as the angle at the second vertex S2. In the present embodiment, the first imaginary line La1 is the arc having the center of curvature that lies at the second vertex S2 and passing through the outer-peripheral-side boundary points PA1, Pa1 of the first magnets A, a, so that the caulking portion 50 can be disposed in the radially intermediate portion of the rotor core 22 with obstruction to the first magnetic-flux passage α being suppressed. It might be possible to set the first imaginary line La1 to an arc having a center of curvature that lies at the first vertex S1 and passing through the outer-peripheral-side boundary points PA1, Pa1 of the first magnets A, a. However, in this arrangement, since the angle at the first vertex S1 is large, the first imaginary line La1 is largely bulged toward the inner peripheral side of the rotor core 22, so that the first magnetic-flux passage α could be formed also in a region on the outer peripheral side of the rotor core 22 than the first imaginary line La1, thereby resulting in a risk that the passage of the magnet magnetic flux could be obstructed by the caulking portion 50. Further, it might be possible to set the first imaginary line La1 to a straight line passing through the outer-peripheral-side boundary points PA1, Pa1 of the first magnets A, a. However, in this arrangement, the region in which the caulking portion 50 is to be disposed becomes narrow so that the caulking portion 50 could not be appropriately disposed.

In the above-described rotor 12 that is to be provided in the rotating electric machine 10, the first imaginary line La1 is the arc having the center of curvature that lies at the second vertex S2 and passing through the outer-peripheral-side boundary points PA1, Pa1 of the first magnetic-flux passage α that are the outer-peripheral-side end portions of the respective first long sides As, as of the rectangular-shaped cross sections of the pair of first magnets A, a, wherein each of the outer-peripheral-side end portions is the first offset point which lies on the corresponding one of the first long sides As, as and which is offset from the outer-peripheral side end of the corresponding one of the first long sides As, as, by the distance corresponding to the first gap, toward the inner-peripheral side end of the corresponding one of the first long sides As, as. The second imaginary line Lb1 is the arc having the center of curvature that lies at the second vertex S2 and passing through the inner-peripheral-side boundary points PB1, Pb1 of the second magnetic-flux passage that are the inner-peripheral-side end portions of the respective second long sides Bs, bs of the rectangular-shaped cross sections of the pair of second magnets B, b, wherein each of the inner-peripheral-side end portions is the second offset point which lies on the corresponding one of the second long sides Bs, bs and which is offset from the inner-peripheral side end of the corresponding one of the second long sides Bs, bs, by the distance corresponding to the second gap, toward the outer-peripheral side end of the corresponding one of the second long sides Bs, bs. The caulking portion 50 is disposed in the position which lies on the q-axis and which is located in the region between the first and second imaginary lines La1, Lb1, namely, in the intermediate portion of the rotor core 22 in the radial direction of the rotor core 22, so that it is possible to establish, for example, a high performance for positioning the multiplicity of laminated steel plates 23 relative to one another.

The first and second magnets A, a, B, b are located symmetrically on the opposite sides of the q-axis in the circumferential direction, and have respective the long sides As, as, Bs, bs in the rectangular-shaped cross sections, wherein the long sides As, as, Bs, bs cooperate to form the inverted V shape that opens toward the inner peripheral side of the rotor core 22. The second magnets B, b are located closer than the first magnets A, a to the outer peripheral side of the rotor core 22, and the angle at the second vertex S2 as the intersection of the extensions of the second long sides Bs, bs of the rectangular-shaped cross sections of the second magnets B, b is smaller than the angle at the first vertex S1 as the intersection of the extensions of the first long sides As, as of the rectangular-shaped cross sections of the first magnets A, a. The first imaginary line La1 is the arc having the center of curvature that lies at the second vertex S2 and passing through the outer-peripheral-side boundary points PA1, Pa1 of the first magnetic-flux passage α, and is approximated with the outer-peripheral-side boundary (magnetic field lines fr2) of the first magnetic-flux passage α. The second imaginary line Lb1 is the arc having the center of curvature that lies at the second vertex S2 and passing through the inner-peripheral-side boundary points PB1, Pb1 of the second magnetic-flux passage β, and is approximated with the inner-peripheral-side boundary (magnetic field lines fr3) of the second magnetic-flux passage β Thus, with the caulking portion 50 being disposed in the region between the first and second imaginary lines La1, Lb1, it is possible to appropriately suppress the caulking portion 50 from obstructing the first and second magnetic-flux passages α, β and accordingly to suppress reductions of the motor torque and the motor efficiency that could be caused by the caulking portion 50.

In the rotor 12 according to the present embodiment, the rotor core 22 is provided with the plurality of magnetic poles Mv that are arranged around the axis O, and each of the magnetic poles Mv is constituted by the plurality of pairs of magnets 24, such that each of the pairs of magnets 24 are disposed symmetrically with each other with respect to the d-axis and are arranged to have the V shape or U shape. The above-described q-axis corresponds to the intermediate line between each circumferentially adjacent two of the plurality of magnetic poles Mv. The plurality of pairs of magnets 24 include the two pairs of magnets 24, such that one of the two pairs is closer than the other of the two pairs to the inner peripheral side of the rotor core 22, and such that each of two magnets 24 of the one of the two pairs corresponds to one of the first magnets A, a while each of two magnets 24 of the other of the two pairs corresponds to one of the second magnets B, b. It is possible to advantageously apply the present invention that makes it possible to dispose the caulking portion 50 in the radially intermediate portion of the rotor core 22 while suppressing the obstruction to the first magnetic-flux passage α between the first magnets A, a and the second magnetic-flux passage β between the second magnets B, b.

Further, each of the magnetic poles Mv has the multi-layer structure including the first layer Mv1 and the second layer Mv2 that is closer than the first layer Mv1 to the outer peripheral side of the rotor core 22, wherein the first layer Mv1 is constituted by at least four of the magnets 24 which include the pair of first magnets A, a and the pair of second magnets B, b and which are arranged to have the V shape or U shape that opens toward the outer peripheral side of the rotor core 22, and wherein the second layer Mv2 is constituted by at least two of the magnets 24 which are other than the pair of first magnets A, a and the pair of second magnets B, b and which are arranged to have the V shape or U shape that opens toward the outer peripheral side of the rotor core 22. In this case, too, with the first and second imaginary lines La1, Lb1 being defined based on the second vertex S2, and with the caulking portion 50 being disposed in the region between the first and second imaginary lines La1, Lb1, it is possible to advantageously obtain effects of the present invention, which are to make it possible to dispose the caulking portion 50 in the radially intermediate portion of the rotor core 22 while suppressing the obstruction to the first and second magnetic-flux passages α, β.

Further, the angle at the first vertex S1 is at least three times as large as the angle at the second vertex S2. There could be an issue that is how to define the first imaginary line La1 related to the first magnets A, a wherein the angle at the first vertex S1 (i.e., angle defined by the extensions of the first long sides As, as of the rectangular-shaped cross sections of the first magnets A, a) is relatively large. The first imaginary line La1 is the arc having the center of curvature that lies at the second vertex S2 and passing through the outer-peripheral-side boundary points PA1, Pa1 of the first magnets A, a, so that the caulking portion 50 can be disposed in the radially intermediate portion of the rotor core 22 with obstruction to the first magnetic-flux passage α being suppressed.

In the above-described embodiment in which each of the magnet receiving portions of the flux barriers 40a, 40b is provided with the recesses such that the corner gaps are defined between the corner portions of the corresponding one of the magnets 24 and the each of the magnet receiving portions, each of the outer-peripheral-side boundary points PA1, Pa1 of the first magnetic-flux passage α is set to the position which lies on a corresponding one of the first long sides As, as and which is offset from the outer-peripheral side end of the corresponding one of the first long sides As, as by the distance corresponding to the corresponding corner gap toward the inner-peripheral side end of the corresponding one of the first long sides As, as, and each of the inner-peripheral-side boundary points PB1, Pb1 of the second magnetic-flux passage β is set to the position which lies on a corresponding one of the second long sides Bs, bs and which is offset from the inner-peripheral side end of the corresponding one of the second long sides Bs, bs by the distance corresponding to the corresponding corner gap toward the outer-peripheral side end of the corresponding one of the second long sides Bs, bs (see FIG. 4). However, in another embodiment shown in FIG. 5 in which each of the magnet receiving portions of the flux barriers 40a, 40b is not provided with recesses such that corner gaps are not defined between the corner portions of the corresponding one of the magnets 24 and the each of the magnet receiving portions, or in which each of the magnet receiving portions of the flux barriers 40a, 40b is provided with extremely small recesses such that corner gaps defined between the corner portions of the corresponding one of the magnets 24 and the each of the magnet receiving portions are ignorably small, a first imaginary line La2 is an arc having a center of curvature that lies at the second vertex S2 and passing through outer-peripheral-side boundary points PA2, Pa2 of the first magnetic-flux passage α that are the outer-peripheral-side end portions of the respective first long sides As, as of the rectangular-shaped cross sections of the pair of first magnets A,a, while a second imaginary line Lb2 is an arc having a center of curvature that lies at the second vertex S2 and passing through inner-peripheral-side boundary points PB2, Pb2 of the second magnetic-flux passage β that are the inner-peripheral-side end portions of the respective second long sides Bs, bs of the rectangular-shaped cross sections of the pair of second magnets B, b. More specifically, the outer-peripheral-side boundary point PA2 of the first magnetic-flux passage α is set to the outer-peripheral side end of the first long side As, the outer-peripheral-side boundary point Pa2 of the first magnetic-flux passage α is set to the outer-peripheral side end of the first long side as, the inner-peripheral-side boundary point PB2 of the second magnetic-flux passage β is set to the inner-peripheral side end of the second long side Bs, and the inner-peripheral-side boundary point Pb2 of the second magnetic-flux passage β is set to the inner-peripheral side end of the second long side bs, as shown in FIG. 5. Thus, in this embodiment shown in FIG. 5, each caulking portion 60 is disposed in a position which lies on the q-axis and which is located in a region between the first and second imaginary lines La2, Lb2 that are defined as described above. Therefore, the caulking portion 60 can be disposed in the radially intermediate portion of the rotor core 22 with obstruction to the magnetic-flux passages α, β being suppressed, so that substantially the same effects can be obtained as in the above-described embodiment.

While the preferred embodiments of the present invention have been described in detail by reference to the drawings, it is to be understood that the embodiments described above are given for illustrative purpose only, and that the present invention may be embodied with various modifications and improvements which may occur to those skilled in the art.

NOMENCLATURE OF ELEMENTS

10: rotating electric machine
12: rotor for rotating electric machine
22: rotor core
23: laminated steel plates
24, A, a, B, b, C, c: magnets
A, a: magnets (first magnets)
B, b: magnets (second magnets)
40a, 40b, 40c, 40d: flux barriers (magnet receiving holes)
50; 60: caulking portions
O: axis
d: d-axis
q: q-axis
Mv: magnetic poles
Mv1: first layer
Mv2: second layer
α: first magnetic-flux passage
β: second magnetic-flux passage
S1: first vertex
S2: second vertex
As, as: first long sides
Bs, bs: second long sides PA1, Pa1, PA2, Pa2: outer-peripheral-side boundary points
PB1, Pb1, PB2, Pb2: inner-peripheral-side boundary points
La1, La2: first imaginary line
Lb1, Lb2: second imaginary line

What is claimed is:

1. A rotor that is to be provided in a rotating electric machine, the rotor comprising:
a cylindrical-shaped rotor core constituted by a multiplicity of laminated steel plates and provided with magnets that are disposed on opposite sides, in a circumferential direction of the rotor core, of a q-axis extending in a radial direction of the rotor core,
wherein the rotor core includes a caulking portion that is provided on the q-axis, such that the laminated steel plates are positioned relative to each other by the caulking portion,
wherein the magnets include a pair of first magnets disposed symmetrically with each other with respect to the q-axis and a pair of second magnets disposed symmetrically with each other with respect to the q-axis, such that the second magnets are located closer than the first magnets to an outer peripheral side of the rotor core,
wherein each of the first and second magnets has a rectangular shape in a cross section thereof perpendicular to an axis about which the rotor is to be rotated, and a distance between the pair of first magnets and a distance between the pair of second magnets on a perpendicular plane perpendicular to the axis are increased in a direction away from the outer peripheral side toward an inner peripheral side of the rotor core,
wherein an angle at a first vertex as an intersection of extensions of long sides of rectangular-shaped cross sections of the pair of first magnets which are opposed to each other with the q-axis being located therebetween, is larger than an angle at a second vertex as an intersection of extensions of long sides of rectangular-shaped cross sections of the pair of second magnets which are opposed to each other with the q-axis being located therebetween,
wherein the pair of first magnets cooperate with each other to define a first magnetic-flux passage therebetween, and the pair of second magnets cooperate with each other to define a second magnetic-flux passage therebetween, and
wherein the caulking portion is disposed in a position which lies on the q-axis and which is located in a region between first and second imaginary lines in the radial direction of the rotor core, such that the first imaginary line is an arc having a center of curvature that lies at the second vertex and passing through outer-peripheral-side boundary points of the first magnetic-flux passage that are outer-peripheral-side end portions of the respective long sides of the rectangular-shaped cross sections of the pair of first magnets, and such that the second imaginary line is an arc having a center of curvature that lies at the second vertex and passing through inner-peripheral-side boundary points of the second magnetic-flux passage that are inner-peripheral-side end portions of the respective long sides of the rectangular-shaped cross sections of the pair of second magnets.

2. The rotor according to claim 1,
wherein the magnets include a plurality of pairs of magnets, such that each of the pairs of magnets are disposed symmetrically with each other with respect to a d-axis passing through the axis and are arranged to have a V shape or U shape that opens toward the outer peripheral side of the rotor core, and such that the pairs are spaced apart from each other in the radial direction of the rotor core,
wherein the rotor core is provided with a plurality of magnetic poles that are arranged at a constant angular interval around the axis, such that each of the magnetic poles is constituted by the plurality of pairs of magnets,
wherein the q-axis corresponds to an intermediate line between each adjacent two of the plurality of magnetic poles, which are adjacent to each other in the circumferential direction of the rotor core, and
wherein the plurality of pairs of magnets include two pairs of magnets, such that one of the two pairs is closer than the other of the two pairs to the inner peripheral side of the rotor core, and such that each of two magnets of the one of the two pairs corresponds to one of the first magnets while each of two magnets of the other of the two pairs corresponds to one of the second magnets.

3. The rotor according to claim 1,
wherein the rotor core is provided with a plurality of magnetic poles that are arranged at a constant angular interval around the axis,
wherein each of the magnetic poles has a multi-layer structure including a first layer and a second layer that is closer than the first layer to the outer peripheral side of the rotor core,
wherein the first layer is constituted by at least four of the magnets which include the pair of first magnets and the pair of second magnets and which are arranged to have a V shape or U shape that opens toward the outer peripheral side of the rotor core, and
wherein the second layer is constituted by at least two of the magnets which are other than the pair of first magnets and the pair of second magnets and which are arranged to have a V shape or U shape that opens toward the outer peripheral side of the rotor core.

4. The rotor according to claim 1,
wherein the angle at the first vertex is at least three times as large as the angle at the second vertex.

5. The rotor according to claim 1,
wherein each of the first and second magnets is received in a magnet receiving hole, such that each of the first magnets is received in the magnet receiving hole with a first gap defined between the magnet receiving hole and a corresponding one of the outer-peripheral-side end portions of respective first long sides that are the respective long sides of the rectangular-shaped cross sections of the first magnets, and such that each of the second magnets is received in the magnet receiving hole with a second gap defined between the magnet receiving hole and a corresponding one of the inner-peripheral-side end portions of respective second long sides that are the respective long sides of the rectangular-shaped cross sections of the second magnets,
wherein the outer-peripheral-side boundary points of the first magnetic-flux passage, through which the first imaginary line passes, are first offset points each of which lies on a corresponding one of the first long sides and each of which is offset from an outer-peripheral side end of the corresponding one of the first long sides, by a distance corresponding to the first gap, toward an inner-peripheral side end of the corresponding one of the first long sides, and wherein the inner-peripheral-side boundary points of the second magnetic-flux passage, through which the second imaginary line passes, are second offset points each of which lies on a corresponding one of the second long sides and each of which is offset from an inner-peripheral side end of the corresponding one of the second long sides, by a distance corresponding to the second gap, toward an outer-peripheral side end of the corresponding one of the second long sides.

\* \* \* \* \*

UNITED STATES PATENT AND TRADEMARK OFFICE
CERTIFICATE OF CORRECTION

| | | |
|---|---|---|
| PATENT NO. | : 12,237,724 B2 | Page 1 of 1 |
| APPLICATION NO. | : 17/666668 | |
| DATED | : February 25, 2025 | |
| INVENTOR(S) | : Toshinori Okochi et al. | |

It is certified that error appears in the above-identified patent and that said Letters Patent is hereby corrected as shown below:

On the Title Page

Item (30), insert:
--Foreign Application Priority Data
February 09, 2021(JP)................................2021-019339--

Signed and Sealed this
Twenty-fourth Day of June, 2025

Coke Morgan Stewart
*Acting Director of the United States Patent and Trademark Office*